United States Patent
Bottos

(10) Patent No.: US 11,915,434 B2
(45) Date of Patent: Feb. 27, 2024

(54) SYSTEMS AND METHODS FOR OBJECT RE-IDENTIFICATION

(71) Applicant: ALWAYSAI, INC., Solana Beach, CA (US)

(72) Inventor: Stephen Bottos, San Diego, CA (US)

(73) Assignee: ALWAYSAI, INC., Solana Beach, CA (US)

(*) Notice: Subject to any disclaimer, the term of this patent is extended or adjusted under 35 U.S.C. 154(b) by 267 days.

(21) Appl. No.: 17/332,522

(22) Filed: May 27, 2021

(65) Prior Publication Data

US 2022/0335626 A1 Oct. 20, 2022

Related U.S. Application Data

(60) Provisional application No. 63/177,166, filed on Apr. 20, 2021.

(51) Int. Cl.
| | |
|---|---|
| G06T 7/292 | (2017.01) |
| G06T 7/246 | (2017.01) |
| H04N 7/18 | (2006.01) |
| G06V 10/40 | (2022.01) |
| G06V 20/52 | (2022.01) |

(Continued)

(52) U.S. Cl.
CPC .............. *G06T 7/292* (2017.01); *G06F 18/22* (2023.01); *G06F 18/25* (2023.01); *G06T 7/248* (2017.01); *G06V 10/40* (2022.01); *G06V 20/52* (2022.01); *H04N 7/181* (2013.01); *G06T 2207/30232* (2013.01); *G06V 2201/07* (2022.01)

(58) Field of Classification Search
CPC ...................... G06T 7/292; G06T 7/248; G06T 2207/30232; G06F 18/22; G06F 18/25; G06V 10/40; G06V 20/52; G06V 2201/07; G06V 20/56; H04N 7/181
See application file for complete search history.

(56) References Cited

U.S. PATENT DOCUMENTS

| | | | |
|---|---|---|---|
| 11,024,105 B1 * | 6/2021 | Brand | G06K 7/10366 |
| 2006/0238383 A1 | 10/2006 | Kimchi et al. | |

(Continued)

OTHER PUBLICATIONS

Kiran et al, ("Moving Object Tracking using Optical Flow and Motion Vector Estimation", Department of Electronics and Telecommunication, SITRC, Pune University Nashik, IEEE 2015, pp. 1-6) (Year: 2015).*

(Continued)

*Primary Examiner* — Amara Abdi
(74) *Attorney, Agent, or Firm* — Sheppard, Mullin, Richter & Hampton LLP

(57) ABSTRACT

Systems and methods are provided for object re-identification. In many scenarios, it would be useful to be able to monitor the movement, actions, etc. of an object, such as a person, moving into and between different camera views of a monitored space. A network of cameras and client edge devices may detect and identify a particular object, and when that object re-appears in another camera view, a comparison can be performed between the data collected regarding the object upon its initial appearance and upon its re-appearance to determine if they are the same object. In this way, data regarding an object can be captured, analyzed, or otherwise processed despite moving from one camera view to another.

20 Claims, 9 Drawing Sheets

(51) Int. Cl.
*G06F 18/22* (2023.01)
*G06F 18/25* (2023.01)

(56) References Cited

U.S. PATENT DOCUMENTS

| | | | |
|---|---|---|---|
| 2008/0100704 A1* | 5/2008 | Venetianer | G06F 16/7854 |
| | | | 348/143 |
| 2013/0343642 A1 | 12/2013 | Kuo et al. | |
| 2014/0245335 A1 | 8/2014 | Holden et al. | |
| 2014/0253732 A1* | 9/2014 | Brown | G06T 7/246 |
| | | | 348/159 |
| 2015/0055830 A1 | 2/2015 | Datta et al. | |
| 2016/0092736 A1 | 3/2016 | Mai et al. | |
| 2018/0374233 A1 | 12/2018 | Zhou et al. | |
| 2019/0130582 A1* | 5/2019 | Cheng | G06T 7/11 |
| 2020/0059672 A1* | 2/2020 | Rossato | H04N 19/85 |
| 2020/0175697 A1* | 6/2020 | Jeon | G06T 7/292 |
| 2020/0364892 A1* | 11/2020 | Ko | G06V 10/806 |

OTHER PUBLICATIONS

He et al., "TransReID: Transformer-based Object Re-Identification," Proceedings of the IEEE/CVF International Conference on Computer Vision, Mar. 26, 2021, Retrieved on Jun. 19, 2022 from https://arxlv.org/abs/2102.04378.

International Search Report & Written Opinion dated Jul. 8, 2022 for International Application No. PCT/US2022/023089, filed Apr. 1, 2022.

\* cited by examiner

SYSTEMS AND METHODS FOR OBJECT RE-IDENTIFICATION

CROSS-REFERENCE TO RELATED APPLICATIONS

This is a non-provisional patent application which claims priority to U.S. Application No. 63/177,166, filed Apr. 20, 2021, which is hereby incorporated by reference in its entirety for all purposes.

TECHNICAL FIELD

The present disclosure relates generally to object recognition, and in particular, to re-identifying objects across multiple camera views.

DESCRIPTION OF RELATED ART

Sensors or monitoring devices may have constraints or limitations with respect to a geographical area that can be monitored. For example, one such sensor/monitoring device, e.g., a video camera, may have a particular field of view or maximum area that the video camera can image. This operational constraint can be a function of lens focal length and video camera sensor size. Thus, users of such video cameras may install multiple video cameras to monitor a given area. As an object moves from one area corresponding to one camera view (imaged by a first video camera) to another area corresponding to another camera view (imaged by a second video camera), it is difficult to analyze/obtain/derive analytics regarding the object on a continuous basis.

BRIEF SUMMARY OF THE DISCLOSURE

In accordance with one embodiment, a method comprises detecting and tracking, using a first camera, an object as it passes through an entry point and moves within a monitored space. Upon exiting a field of view of the first camera, the object can be re-identified pursuant to detection of the object by a second camera. Information regarding the object from the first and second cameras can be aggregated.

In some embodiments, the method further comprises performing feature extraction on a first captured image of the object, and generating a first vector code representation of the object by a first client edge device operatively connected to the first camera.

In some embodiments, the method further comprises performing feature extraction on a second captured image of the object, and generating a second vector code representation of the object by a second client edge device operatively connected to the second camera.

In some embodiments, the method further comprises comparing, at a local cluster server operatively connected to the first and second client edge devices, the first and second vector code representations of the object to determine that the first and second vector code representations represent the object detected and tracked by the first camera, and detected by the second camera.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
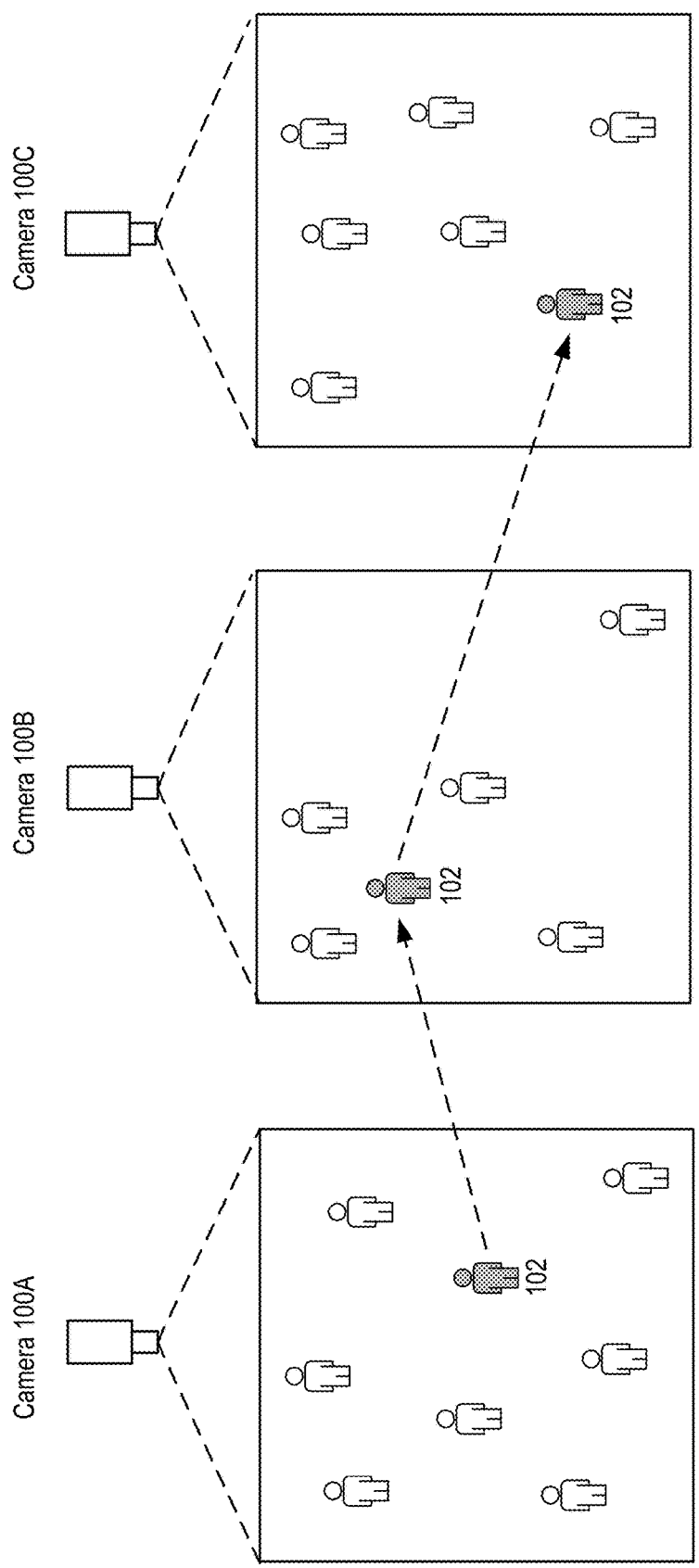
FIG. 1 illustrates an example multi-camera surveillance scenario in which various embodiments may be used.

The figures are not exhaustive and do not limit the present disclosure to the precise form disclosed.

DETAILED DESCRIPTION

As alluded to above, gathering information or analyzing aspects, actions, characteristics of an object(s) as it moves through different (discontinuous or continuous) camera views can be difficult. Without some coordination between the cameras, an object is recognized as a new object (if it is recognized at all) each time it appears in a camera view. Thus, the aspects, actions, or characteristics of the object cannot be aggregated across the multiple camera views.

Accordingly, various embodiments of the present disclosure described herein are directed to systems and methods of object re-identification across multiple camera views. In some embodiments, an object can be tracked or monitored from one region of interest (ROI) to another. In some embodiments, an ROI may correspond to a particular camera view. In some embodiments, an ROI may correspond to some subset or portion(s) of a particular camera view(s). ROIs need not necessarily be continuous. Indeed, as noted above, scenarios exist where tracking or monitoring objects across multiple, discontinuous camera views may be desired.

Before describing various embodiments in greater detail, it would be useful to define or explain certain terminology used throughout the present disclosure. The term "camera/view/field of view" can refer to the view frustrum (or the plane or spatial view thereof) of the camera. In some embodiments, objects may be named in reference to the camera by which they may be detected, although this naming or labeling schema is not meant to be limiting, and other naming or labeling methods may be used in other embodiments.

The term "mainzone" can refer to the entire viewing frame of a camera or some polygonal region of the viewing frame. The association of the polygonal region of the viewing frame may be a technical limitation of the camera and not a limitation of the system. Rather, the mainzone may correspond with any shape identified by the system. Although typically, a single mainzone corresponds to a single ROI, this is not always the case. In use, a camera might make detections outside of the mainzone, but these can be ignored.

The term "subzone" can refer to one or subsets/subdivisions of a mainzone, and may not extend outside of the mainzone. Subzones need not share boundaries with either the mainzone or other subzones. In some examples, subzones can be used in order to test whether or not a bounding box is within their respective boundary for the purpose of analytics (e.g., if the centroid of a bounding box is located in a subzone AA of mainzone A, this location data can be reflected in the set of analytics). In some examples, the boundaries of the mainzone and one or more subzones may be determined manually by the user interacting with a user interface and/or being stored by the system.

The term "entrance" or "entry point" can refer to a special type of subzone. Typically, there is one entrance/entry point to the network of cameras as a whole, meaning one camera within the network contains the entrance subzone within its mainzone. If an object passes through the entrance or entry point, it may be considered a new object and can be added to an object gallery as-is rather than an object to be re-identified with other object gallery entries (described in greater detail below). Following the nomenclature, all objects can be named according to the camera which contains the entry point, but could also be named according to the mainzone which contains the entry point.

The term "opt-out zone" can refer to another special type of subzone. Opt-out subzones may be optional. For example, due to privacy issues, regulations, or constraints, an opt-out subzone may be required in certain areas of operation, whereas in others, opt-out subzones may not necessarily be needed. As the name suggests, if an object lingers in the opt-out subzone in excess of a threshold amount of time, the lingering may trigger an intentional opt-out command. In some instances, this may prevent analytics or other processes (e.g., feature extraction, etc.) from being saved for this object during its visit to the space.

Various technical advantages are realized throughout the disclosure. For example, by recognizing objects across multiple regions of interest (ROI), less computer processing is needed to initially recognize these objects from different camera sources. The amount of stored data may be reduced, thus potentially reducing the amount of storage space needed to perform these computations and less data is transmitted via the network (e.g., from a local cluster server to a global cluster server). Embodiments of the application may also help reduce response times and bandwidth needed to perform various analyses described herein.

In some examples, the cameras or other devices may be moved around the area of operation (e.g., in an autonomous vehicle use case, in a retail or warehouse environment, etc.). Physically moving the cameras may automatically (or manually) alter the ROI and/or corresponding mainzone and one or more subzones. In this example, the monitored area may be adjusted in accordance with updated needs of the user and further increase the technical advantages realized throughout the disclosure.

FIG. 1 illustrates an example scenario, in accordance with some embodiments of the disclosure. In the illustration three cameras 100, e.g., cameras 100A, 100B and 100C, may each have or may capture a particular camera view. A particular object, in this example scenario, object 102, can be a person, thing, or other entity that moves between each camera's respective camera view, e.g., field of view (FOV). As illustrated in FIG. 1, object 102 may move from a view of camera 100A to a view of camera 100B, and on to a view of camera 100C. In some embodiments, object 102 may be initially identified by a camera, in this example, camera 100A. As object 102 traverses an area(s) and subsequently appears in the view(s) of other cameras, in this example, cameras 100B and 100C, object 102 is "re-identified."

In this way, any information or data captured or sensed and associated with object 102 (e.g., set of analytics) can be combined into a single dataset, i.e., object 102 is recognized by cameras 100B and 100C as being object 102 that was initially detected by camera 100A. For example, camera 100A may detect movement of object 102 within a first ROI, and camera 100A (or a corresponding client edge device) may note an amount of time that object 102 remains in the first ROI. Camera 100A may detect certain actions performed by object 102 within in the first ROI, and so on. Camera 100B may detect the presence of object 102 in its corresponding ROI, e.g., a second ROI, and its corresponding client edge device may gather and cache or store data associated with object 102 during the time object 102 remains in the second ROI. Likewise, camera 100C may detect the presence of object 102 upon entry into camera 100C's corresponding ROI, i.e., a third ROI. Again, an associated client edge device may store or cache data associated with object 102 during the time it remains within the third ROI. Statistical or analytical operations can be performed on this single dataset to learn about object 102, predict future actions of object 102, and so on.

Figure 2A:
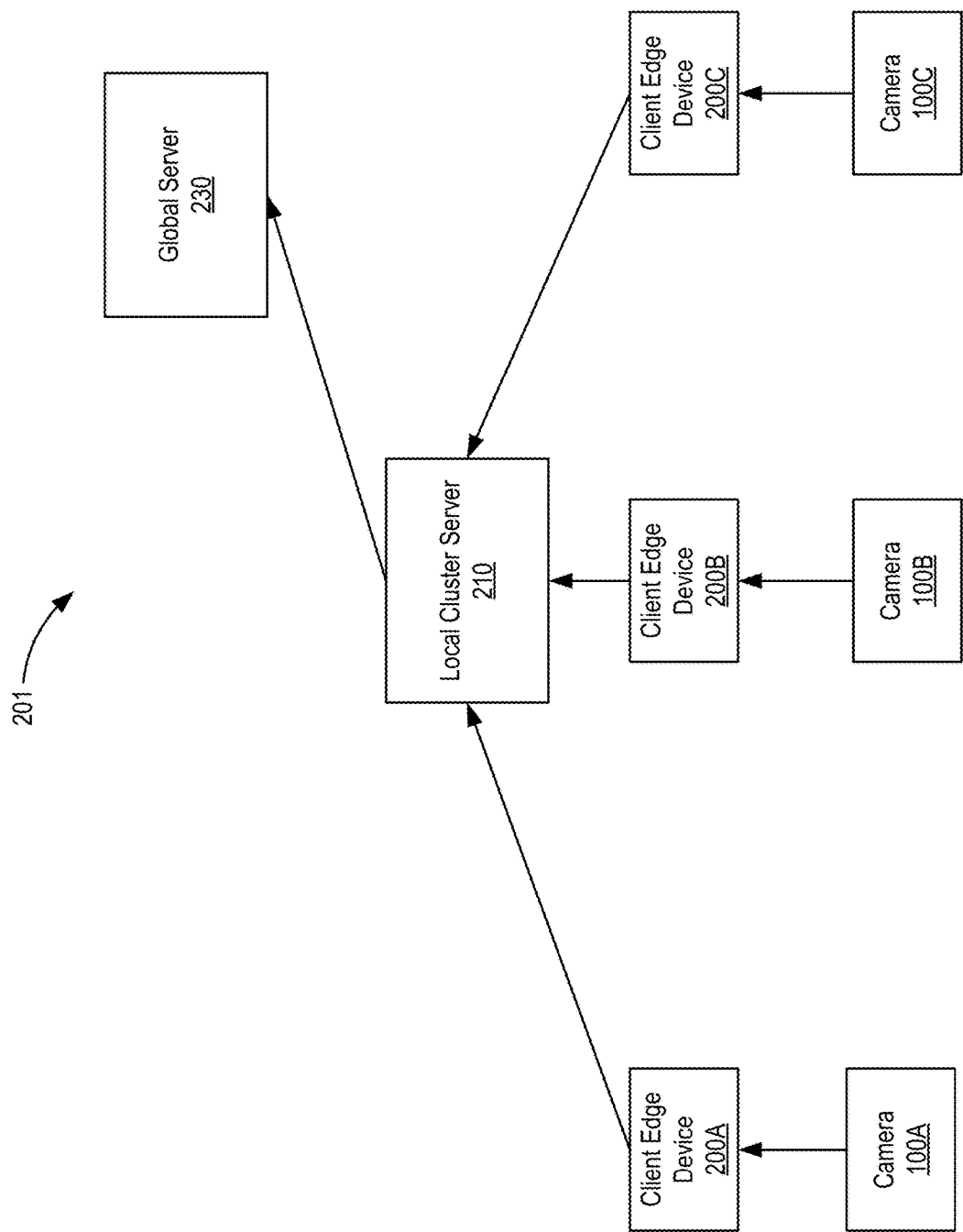
FIG. 2A is a schematic representation of an object re-identification system architecture in accordance with one embodiment.

Referring now to FIG. 2A, and as alluded to above, each camera 100A, 100B, and 100C (FIG. 1) may be operatively connected with a corresponding client edge device, e.g., client edge device 200A, 200B, and 200C, respectively. These camera-client edge device sets may comprise a local cluster of sensors and/or sensing systems, each of which report collected data to a local cluster server 210. That is, the data that has been gathered by client edge devices 200A, 200B, and 200C, via its respective camera 100A, 100B, and 100C, can be transmitted or forwarded to local cluster server 210 to be aggregated, and where objects can be identified and re-identified (described in greater detail below). In turn, local cluster server 210 may transmit aggregated data regarding a particular ROI(s) or object(s) detected and monitored throughout its presence within the ROI(s) corresponding to cameras 100A, 100B, and 100C to a global server 230.

Global server 230 can be a centralized server(s) or representative of a distributed set of servers (not shown) that can receive local cluster aggregated statistics, analytics, etc. received from a plurality of local cluster servers to which it is operatively connected, e.g., local cluster server 210. For example, a corporate entity, such as a clothing store business can maintain a global server 230 to obtain statistics and/or analytics regarding customer presence, customer shopping progression and/or habits, etc. at each of its retail establishments. Each retail establishment may correspond to a local cluster of client edge devices 200 and cameras 100. The above elements may comprise a network 201 or a portion of a network, such as a wireless local area network (WLAN), a wide area network (WAN), a LAN, a cellular network, or other appropriate network or combination of networks.

Figure 2B:
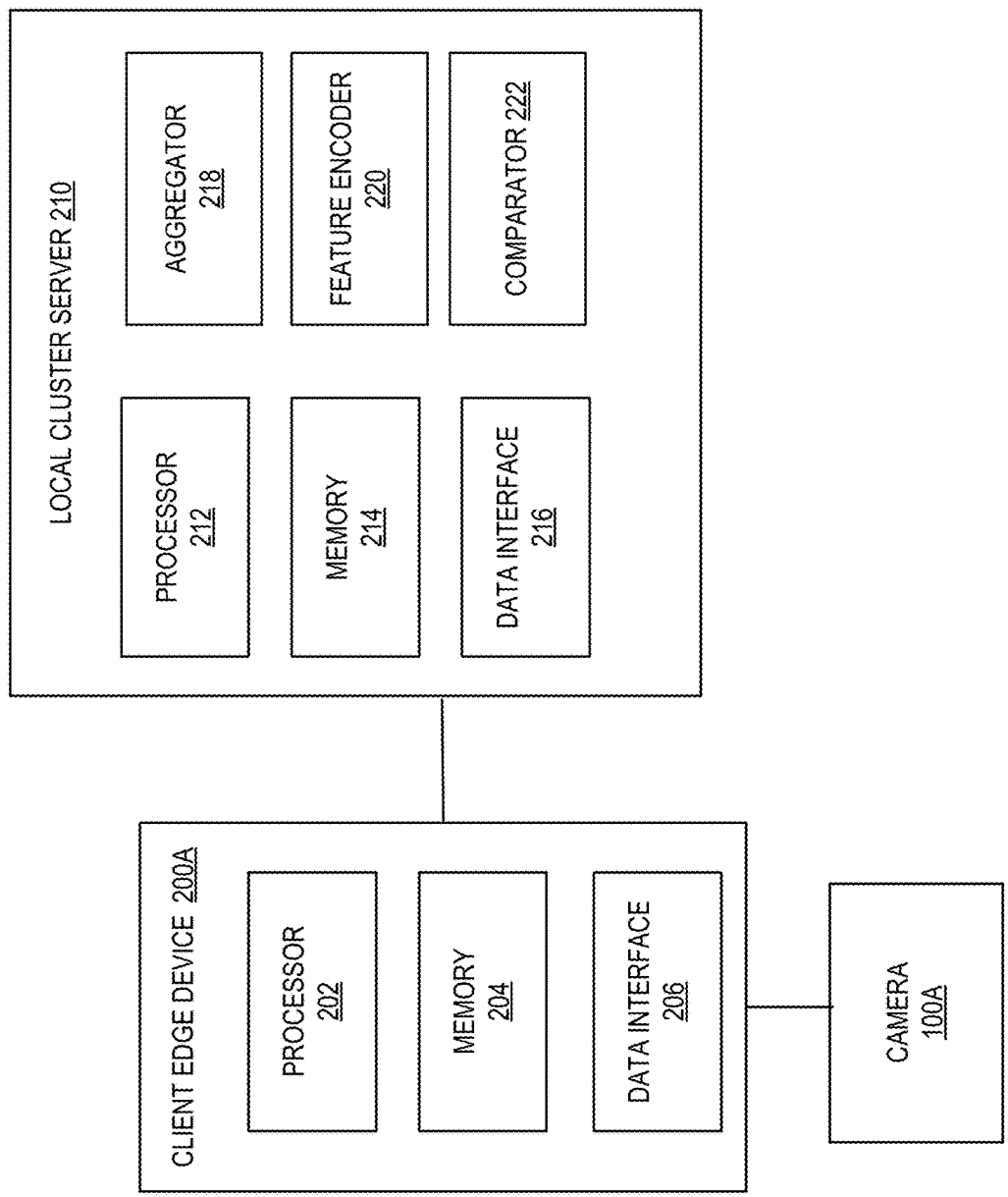
FIG. 2B is a schematic representation of certain component parts of certain elements of the object re-identification system architecture of FIG. 2A.

As illustrated in FIG. 2B, images, frames, or other data regarding an ROI captured by camera 100A may be communicated to client edge device 200A. Camera 100A may be an imaging device that images the external circumstances or scene(s) of a particular ROI(s). For example, camera 100A can be a monocular camera, a stereo camera, a still camera, a video camera, a color camera, a night-vision capable camera, a high resolution camera, a low resolution camera (although high resolution cameras are not necessarily needed), and the like.

Client edge device 200A may comprise, in part, a processor 202, a memory 204, and a data interface 206. Data (e.g., captured images, frames, etc.) from camera 100A may be sent to client edge device 200A and received by data interface 206. Data interface 206 may be, e.g., a communications circuit that can include a wireless transceiver circuit with an associated antenna (not illustrated) and/or a wired input/output (I/O) interface with an associated hardwired data port (not illustrated). The wireless transceiver circuit can include a transmitter and a receiver (not shown) to allow wireless communications via any of a number of communication protocols such as, for example, Wi-Fi®, Bluetooth®, near field communications (NFC), Zigbee®, and any of a number of other wireless communication protocols whether standardized, proprietary, open, point-to-point, networked, or otherwise. The antenna may be coupled to the wireless transceiver circuit and may be used by the wireless transceiver circuit to transmit radio signals wirelessly to wireless equipment with which it may be connected and to receive radio signals as well. These RF signals can include information of almost any sort that may be sent or received by client edge device 200A from camera 100A. The wired I/O interface can include a transmitter and a receiver (not shown) for hardwired communications with other devices using Ethernet or any number of other wired communication protocols whether standardized, proprietary, open, point-to-point, networked, or otherwise. Data interface 206, may further be used to transmit data from camera 100A and stored in memory 204 to local cluster server 210.

It should be understood that in some embodiments, the functionality and/or features residing in client edge device 200A may alternatively reside in camera 100A. For example, camera 100A may have communications capabilities, along with the capability to store data captured by camera 100A. Such flexibility in implementation may allow legacy or conventional cameras to be used in some scenarios, while more fully-featured cameras can be used in other scenarios. In some embodiments, processor 202 may be configured to perform initial filtering of images or frames corresponding to object 102 (or other objects) in camera 100A's view and/or corresponding ROI. For example, to reduce the amount of data sent to local cluster server 210, processor 202 may filter duplicate or near-duplicate images or frames. Rather than transmitting all the captured data to local cluster server 210, only a sample set(s) or subset(s) of the images or frames captured by camera 100A may be sent.

Local cluster server 210 can comprise a hardware or virtual server that includes a processor 212, a memory 214, and network communication capabilities (e.g., data interface 216). In some embodiments, local cluster server 210 can send and receive data to and from client edge devices, e.g., client edge device 200A (as well as other servers, data repositories, and the like). It should be understood that in some embodiments, statistical data, analytics, or related information/data can be fed back to client edge devices or cameras from local cluster server 210, which in turn can receive feedback from global server 230. As alluded to above, statistical analysis, big data analytics, machine learning, or other processes can be performed on or with the aggregated data. The results of these analyses or processes can be used to further refine the operation of camera 100A or client edge device 200A. For example, certain objects detected or monitored within an ROI may be deemed to be unimportant, and camera 100A or client edge device 200A can be updated to ignore such objects. In some examples, camera 100A or client edge device 200A can bypass storing data related to such objects.

Aggregator 218 of local cluster server 210 may combine data received from a plurality of client edge devices, one of which may be client edge device 200A. Aggregator 218 may receive multiple datasets from the same client edge device and may aggregate data related to or regarding the same object(s), a similar object(s), data regarding the ROI over some duration, etc. For example, local cluster server 210 may receive datasets from client edge device 200A tagged or identified with a particular object identifier. For example, aggregator 218 may combine data associated or tagged with the same object identifier.

In one embodiment, a feature encoder 220 of local cluster server 210 may comprise an autoencoder and/or initiate an autoencoding process, in this case, of images or frames captured by camera 100A. Feature encoder 220 may be configured to find, e.g., certain features, such as the most prominent features of the image or frame. These features may be used to create a feature-based representation of the original image or frame. For example, feature encoder 220 can be, e.g., a neural network, trained to extract such features to determine distinguishing features that can be used to identify a particular object(s), aspects of the scene, etc.

Figure 2C:
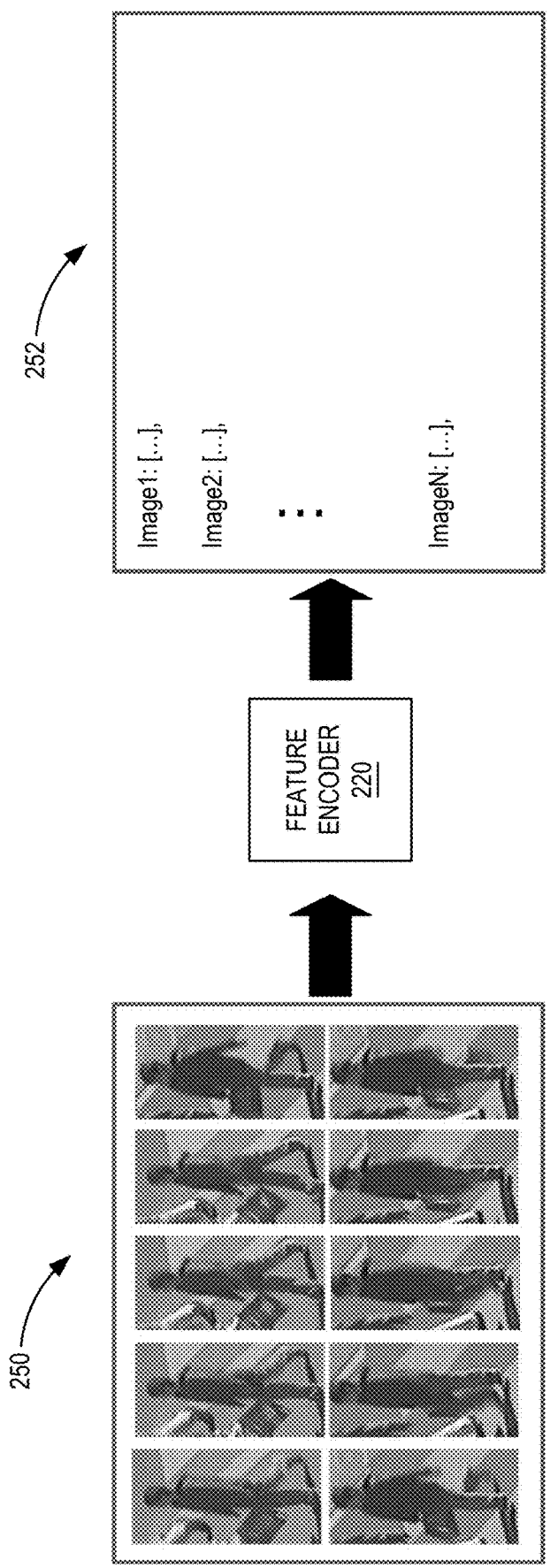
FIG. 2C illustrates an example feature encoding process in accordance with one embodiment.

Referring now to FIG. 2C, a set of raw images 250 can be created for each object of interest or each object detected in an ROI, etc. For example, the set of raw images 250 may comprise raw images of object 102. In some embodiments, a bounding box may be generated about some location data (e.g., scene feature) or object relative to which images may be captured (e.g., encircling, surrounding, around the object, etc.). For example, a bounding box (e.g., a set of points within which points of interest lie) can be created about an object, such as a person carrying a bag. The person and the bag may be individual objects associated with the bounding box. The set of raw images 250 can be made up of images or portions or snippets of images extracted from or based on the created bounding box.

Feature encoder 220 may extract, for example, prominent features of the bounded object and can output those features to an object gallery 252 representative of all or some subset of images of object 102 captured by camera 100A. The features may be output as a raw image. For example, feature encoder 220 may extract features such as the shape of the bag being carried, the color of the bag, and other identifying features or aspects of the object. An assumption can be made that a tracked bounding box may bound or contain the same object(s). The output of feature encoder 220 may be a plurality of image sets or vectors, each corresponding to one of the set of raw images 250. Each image (1–N) may be represented by an M-by-1 (M×1) dimensional feature vector corresponding to a given image in object gallery 252. This feature vector might also be referred to as an "embedding," which represents the encoded representation of the image as outputted by an auto-encoder or a more sophisticated CNN-based model architecture trained to learn how to recognize intra-class differences (e.g. embodied by feature encoder 220). In the case of an auto-encoder, this may be the reduced-dimension vector that would be used for decoding in non-CNN-based circumstances. In a CNN-based approach, this may be the output of the final set of convolutions just before the fully connected layers. It should be understood that feature encoder 220 may be embodied as an unsupervised learning component trained using supervised learning methods. Feature encoder 220 can, in effect, decompose an image(s) into a lossless or lossy compressed representation (e.g., vector code) that can be decoded to reconstruct the image using a decoder. After feature encoder 220 and a corresponding decoder (not shown) have been trained, the decoder can be discarded, leaving just feature encoder 220 to extract features and output image vectors or vector codes.

Figure 2D:
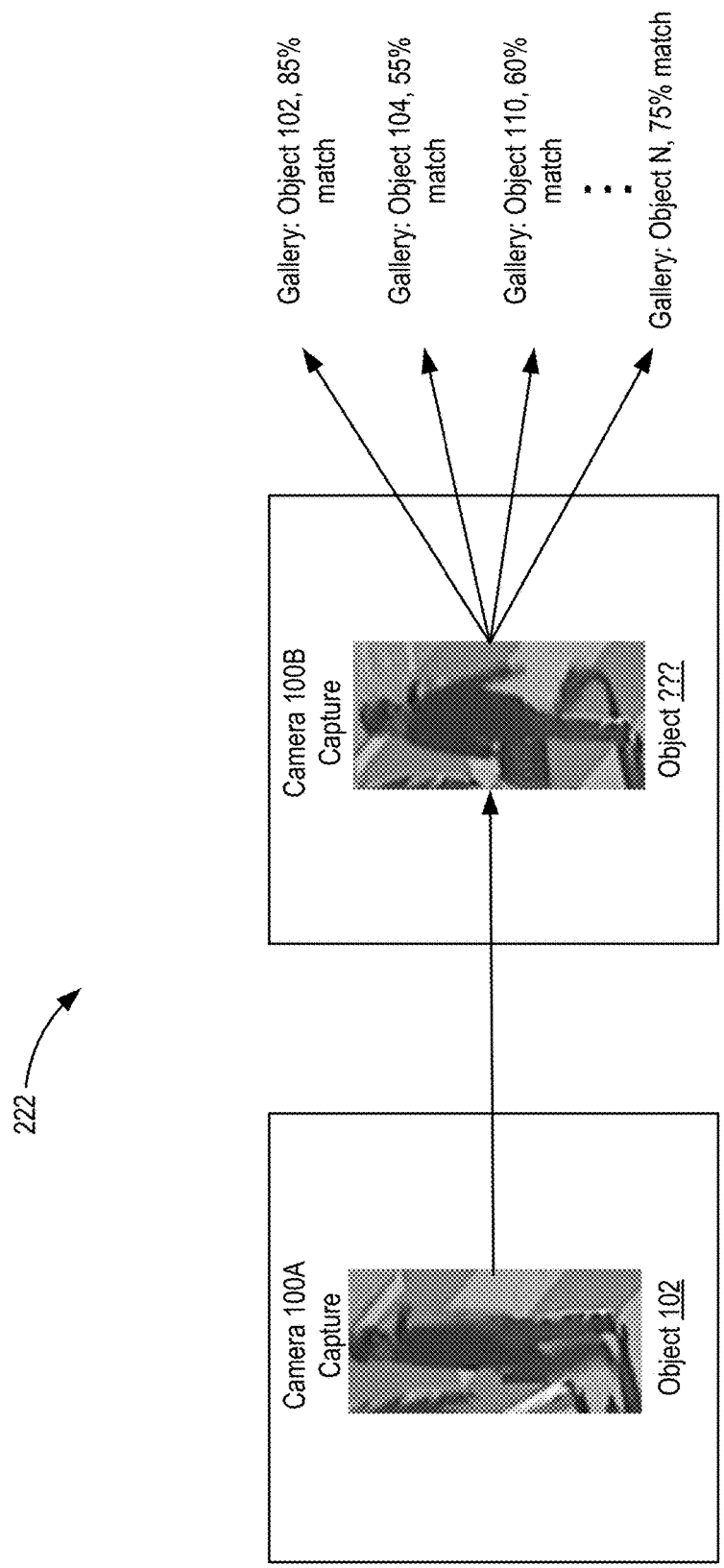
FIG. 2D illustrates an example object image comparison in accordance with one embodiment.

Local cluster server 210 may further comprise a comparator 222. Comparator 222 may be a module or component configured to compare images in a gallery corresponding to a first camera view (e.g., of an ROI, etc.) to images in a gallery corresponding to a second camera view. Referring to FIG. 2D, an image representative of object 102 captured by camera 100A, and included in the above-described object gallery corresponding to identified object 102, can be compared to an image captured by camera 100B. Following the example of FIG. 1, object 102 may move from an ROI within the field of view of camera 100A to another ROI within the field of view of camera 100B. To provide or obtain a pool of samples relating to each object (e.g., object 102) in the form of feature vectors, and to enable maintaining a record or log of where object 102 travels, where it may be at a given time, and/or actions performed by object 102, object 102 may be re-identified upon entry into a second ROI covered by another camera. In this case, the other camera is camera 100B with its corresponding ROI. The additional data allows for a comparison of multiple feature vectors to obtain a more robust re-identification result. With respect to the aforementioned bounding boxes, box-bound images may be generated and saved to provide a human-interpretable representation of the feature vectors. This may allow for potential repeated use (e.g., gender data detection, age data detection, and so on). Thus, bounding boxes may correspond to object detections and they may also be saved in the object gallery 252 as needed, configured, or determined.

In some examples, no reidentification may be performed. For example, upon entry into a space, the object may spend some amount of time within the field of view of a camera (e.g., camera 100A). No reidentified may be performed. Rather, analytics can be obtained simply through tracking the object (e.g., object 102) and the historical actions and/or analytics may be saved in object gallery 252 (described in greater detail below) as images and corresponding features, tagged, or identified accordingly. Upon leaving the view of camera 100A and entering another ROI (e.g., camera 100C), object 102 can be detected and tagged or identified as a new object relative to camera 100C, whereupon new data stores (e.g., folders, etc.) for storing images and features associated with object 102 from the perspective of camera 100C may be created. If there is no entry point ROI in camera 100C's view, it may be assumed that object 102 should be re-identified. Once the requisite (configurable) number, n, of frames or images have been captured containing data or information about object 102 (e.g., five frames, etc.), the corresponding feature vectors of the frames may be compared to feature vectors of potential matches in object gallery 252. This comparison of feature vectors can be performed. The comparison may be implemented using a cosine similarity metric, although other methods of comparison may be used. Upon finding a match (if a match exists), the five frames of "interim" data can be discarded from object gallery 252 and any additional data or information collected regarding object 102 from camera 100C may be saved. The location to save the additional data may correspond to the original file location (e.g., under images and/or features files corresponding to object 102 and camera 100A). That is, images or features captured by camera 100A may be saved as images/camA_1 and features/camA_1 and further images/features captured by camera 100C may be saved under the same files, since object 102 has been re-identified as being the same object detected by camera 100A. In other embodiments, the interim data may be moved for storage to the files/folder corresponding to object 102 and camera 100A, rather than deleting the interim data.

Like camera 100A, camera 100B may capture images or frames of a scene and extract features using a feature encoder, the output of which may be stored with a camera 100B gallery. However, camera 100B may capture images or frames that include an object (e.g., object 102) that was previously detected or monitored in another (or the same) ROI by a different camera, in this example, camera 100A. The object-specific galleries generated based on image or frame captures made by camera 100A (e.g., gallery 252 for object 102) can be compared to object-specific galleries generated based on image or frame captures made by camera 100B. Matches or potential matches can be determined based on how closely the extracted features of one object match that of another object (e.g., within a predetermined threshold value). If they are similar enough, a determination can be made by local cluster server 210 that the object detected or monitored by camera 100B is the same as the object detected or monitored by camera 100A.

It should be understood that thresholds regarding matching objects can be customized or adjusted in accordance with user or system desires or needs. For example, if an entity, such as a store, utilizes various embodiments to detect potential shoplifters, the threshold for matching detected or monitored shoppers may be higher than a store utilizing various embodiments just to track general numbers of patrons in a retail location.

It should also be understood that an object gallery may exist as a data bank or repository of information used for either re-identification (e.g., using the feature vectors) or further examination (e.g., the raw images and corresponding bounding boxes from which each feature vector was created). ROI-associations may be analyzed using the location of the bounding box at the time of identification from the client edge device (using some point within or on the bounding box). For example, an object gallery may contain a number of entries equal to the amount of unique visitors to a space, named according to the camera at which the visitor was first detected (e.g., if the entrance is in the view of camera 100A, visitors might be named camA_1, camA_2, . . . , camA_N). These entries may be saved as folders in the gallery and any further associations to this visitor may be saved under this folder (e.g., camA_1 might contain images camA_1_1, camA_1_2, camA_1_3, camB_1_1, camB_1_2, . . . etc. as well as feature vectors, where visitor camA_1 was re-identified as camB_1).

Accordingly, having object gallery entries associated with ROIs can be useful in the event that a camera's view was obstructed significantly and effectively split into two discontinuous regions. In some embodiments, more fine-grained identifiers for visitors may be implemented (e.g., "camA_roiA_1"), where the entrance to a space is located in roiA of camA. Then, a visitor might be detected in roiB of camA, before moving into the field of view of another camera (e.g., camera 100B). With camA_roiA_1 as the parent folder, entries may follow the naming schema camA_roiA_1_n, camA_roiB_1_n, and camB_1_n. It should be noted that camera 100B may not require an ROI identifier unless it is also effectively split into two discontinuous views. In some embodiments, an ROI designation may be used if one camera feed is obstructed such that continuous tracking within its view is not possible. In some embodiments, comparisons between objects existing in all ROI's can be made. In other embodiments, a comparison need not be made between an unknown object and known objects for the purpose of re-identification unless there is significant discontinuity separating the unknown object from all known objects. In the case of intra-view ROI zones, and under normal conditions, object tracking may be sufficient.

As illustrated in FIG. 2D, it can be appreciated that the highest probability of a match between the received image and stored images is for object 102. That is, camera 100B appears to have detected or monitored the same object (object 102) that exited the ROI or field of view of camera 100A. Thus, object 102 has been "re-identified" by another camera. In the event that it is unclear whether a match has been identified (e.g., if there are more than one potential matches based on the same or similar matching percentage, etc.), additional comparative iterations may be performed by comparator 222 until a more definitive match can be identified. For example, comparisons can be performed by comparing the similarly between extracted features represented by the vector code representations generated via one or more of the object-specific gallery images.

When a match is detected, the corresponding galleries (e.g., the object-specific galleries created or populated by each camera) can be combined. In some embodiments, the data (e.g., images, frames, or vector codes representative of the object) can be combined into a single object-specific gallery that, in turn, can represent a "profile" of that object. It should be understood that the term profile can refer to a collection of feature vectors with respect to a particular object. For example, if one-hundred frames containing the same object (determined through re-identification) are captured throughout a network of cameras, the corresponding one-hundred feature vectors or a subset thereof can be described as its profile. If, in subsequent frames, this object has disappeared from captured images and an unidentified object has appeared somewhere else in the network, the profile of the lost object can be checked against the newly collected profile of the unknown object in order to determine whether or not a match is found relative to all other profiles of all other lost objects in the network.

In some embodiments, comparator 222 may be used again to determine if any captured images in the aggregated dataset are duplicative (e.g., have high percentage feature matches, etc.). If so, any "redundant" images can be deleted to save resource space (e.g., in memory 214 of local cluster server 210). In this way, any aggregate reporting about a space covered by one or more cameras and corresponding with a local cluster server can be optimized or minimized prior to transmitting to a global server (e.g., global server 230).

It should be noted that recent computing trends have focused on what can be referred to as edge processing or edge computing. Edge processing or edge computing can refer to the execution of aggregation, data manipulation, or other processing or compute logic as close to the physical system as possible (e.g., as close to the sensor, in this case, the camera). In this way, response times, bandwidth, etc. can be reduced or saved. For example, in some conventional machine learning or Internet of Things (IoT) systems, data may be collected at the edge of a network, via edge nodes/sensors, and then transmitted to a centralized processor or server to be analyzed, annotated, and so on. However, there is a cost to transmitting such data (both from a monetary and resource-usage perspective). Accordingly, various embodiments employ client edge devices (e.g., client edge devices 200A, 200B, 200C) to perform at least some compute operations or processing (e.g., the aforementioned aggregating of images or frames, the creation of object-specific galleries, etc.).

Figure 3:
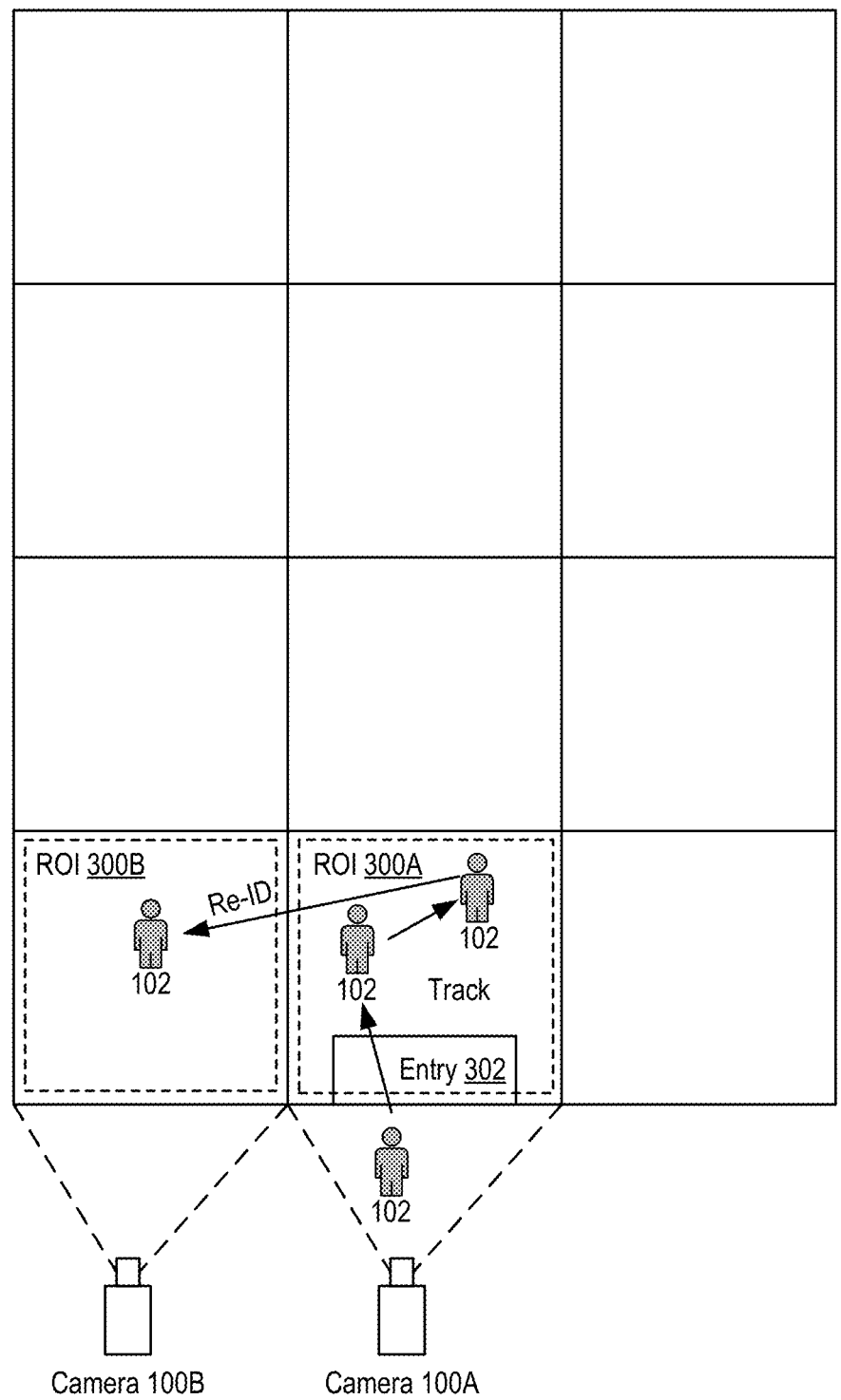
FIG. 3 illustrates an example re-identification scenario in accordance with one embodiment.

FIG. 3 illustrates another example scenario of object detection or monitoring across multiple cameras in accordance with various embodiments. FIG. 3 will be described in conjunction with FIG. 4, which corresponds with a flow chart illustrating example operations that can be performed to re-identify an object.

Figure 4:
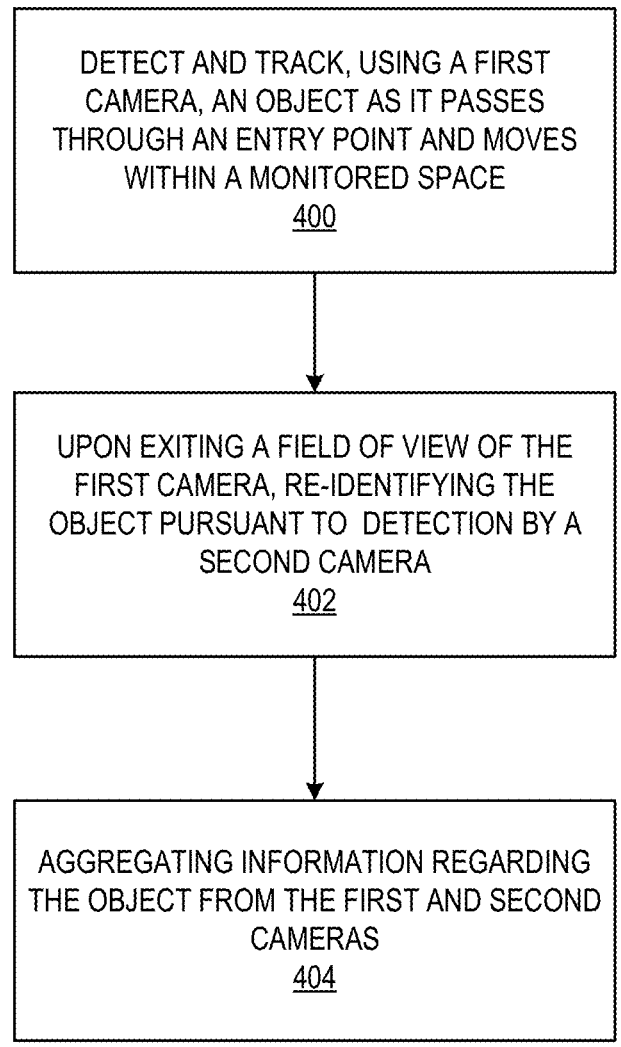
FIG. 4 is a flow chart illustrating example operations to achieve object re-identification in accordance with one embodiment.

Referring first to FIG. 3, first camera 100A and second camera 100B are illustrated as imaging ROIs 300A and 300B, respectively, each corresponding to a mainzone. Referring now to FIG. 4, at operation 400, an object is detected and tracked, using first camera 100A, as it passes through an entry point and moves within a monitored space. In this example, the monitored space corresponds with ROI 300A. As discussed above, a client edge device (not shown in FIG. 3) may be operatively connected to first camera 100A to receive any images or frames captured by first camera 100A. As also discussed above, a local cluster server (not shown in FIG. 3) may aggregate some or all of the captured images or frames from first camera 100A, identify a particular object (e.g., object 102), and track or monitor the movement of that object within ROI 300A. The local cluster server, based on a bounding window, may generate a gallery, such as an object-specific gallery, corresponding to an object(s) of interest (e.g., object 102).

In terms of capturing of images, images may be sampled from a camera feed at whatever rate is supported. For example, if it takes 100 ms to process one image entirely, then ten-images per second may be sampled from the camera feed. This rate can be dynamically adjusted and may help ensure that real-time processing is maintained. By default, in some embodiments, information from every processed frame is passed along to the local server (e.g., local cluster server 210) to be further processed. All objects detected may typically be stored in or used by object gallery 252 to some extent.

Tracking can be performed as well. For example, a multiple Kalman filter-based approach may implement the tracking, in which each object, upon the first detection in the zone, is initialized as a Kalman filter. It should be noted that the Kalman filter can accurately estimate motion of an object based on as little as two or three frames. If an object containing a label of interest (i.e., person) is detected in the feed, tracking and sending of data to the local server can commence immediately. Upon detecting an object at a first frame, the Kalman filter can generate a prediction regarding the object's location in a second frame. Upon detecting an object at the second frame, a true location of the object is compared with the predicted location of the object, and if it is below a certain distance threshold, this is considered the new location of the object from the first frame. As more objects are detected in a frame, this can occur at a larger scale with each object being associated with the object in the last frame to which the predicted location is closest.

It should be noted that typically, an entry point or location can be designated for a particular monitored space, as a whole. The space may comprise one or more ROIs (e.g., where each ROI may correspond to a particular camera view). Regardless, an entry point or location can refer to an entrance or entry zone through which objects pass. Use of an entry point in accordance with various embodiments allows the "problem" or process of object identification or re-identification to be reasonably constrained in scope, making it "solvable." That is, any new objects detected further or "deeper" into the monitored space can be re-identified pursuant to some previously lost detection by another camera. For example, in a retail shopping context, the monitored space may be the entirety of the retail shopping area, and an entry point may be the front door to the retail shopping area. Here, entry point 302 is an entry point for ROI 300A. Upon detecting object 102 passing into or through entry point 302, camera 100A can begin to track and monitor the movement or actions of object 102 in ROI 300A. An entry point can, but need not necessarily, correspond to a physical entry point, but rather to some area of coverage of a camera where and/or when the camera should detect the presence of an object and begin tracking or monitoring that object within a given ROI. It should be understood that while object 102 remains in ROI 300A, camera 100A may continuously monitor object 102 (e.g., camera 100 may capture a continuous image/video feed, etc.).

The local cluster server corresponding to camera 100A may generate a profile representative of the movement or action of object 102 while present in ROI 300A. This profile can be as comprehensive as desired or as simple as desired (e.g., just a position in accordance with some coordinate space) at which an image of object 102 is captured. As noted above, this profile may relate to data collected for the purposes of re-identification, probability of transition between two cameras, etc.

If and when an object (e.g., object 102) leaves an ROI of camera field of view (e.g., ROI 300A) and moves into another region (e.g., ROI 300B), that object may be re-identified by a second camera. That is, at operation 402, upon exiting a field of view of the first camera, the object is re-identified pursuant to detection by a second camera. In the example scenario of FIG. 3, object 102 has exited ROI 300A and entered 300B, where it is detected by camera 100B. As described above, camera 100B may collect images or frames of object 102 and generate a gallery of images, which can then be compared to vector representations of the gallery of images or profile generated by the local cluster server based on the imaging performed by camera 100A. If a match exists, the object that appeared in ROI 300B can be re-identified as object 102 that was previously detected and tracked in ROI 300A. It should be understood that each time object 102 moves from one camera's field of view or corresponding ROI to another, the process of re-identifying object 102 by another camera can be repeated.

At operation 404, information regarding the object from the first and second cameras can be aggregated. As discussed above, a local cluster server, such as local cluster server 210 may transmit aggregate analytics or statistics to a global server, such as global server 230. In this way, an activity within an ROI or the activity or movement of a particular object of interest can be tracked across multiple cameras fields of view. As will be described in greater detail below, the information sent to global server 230 can be used in a variety of ways.

Figure 5:
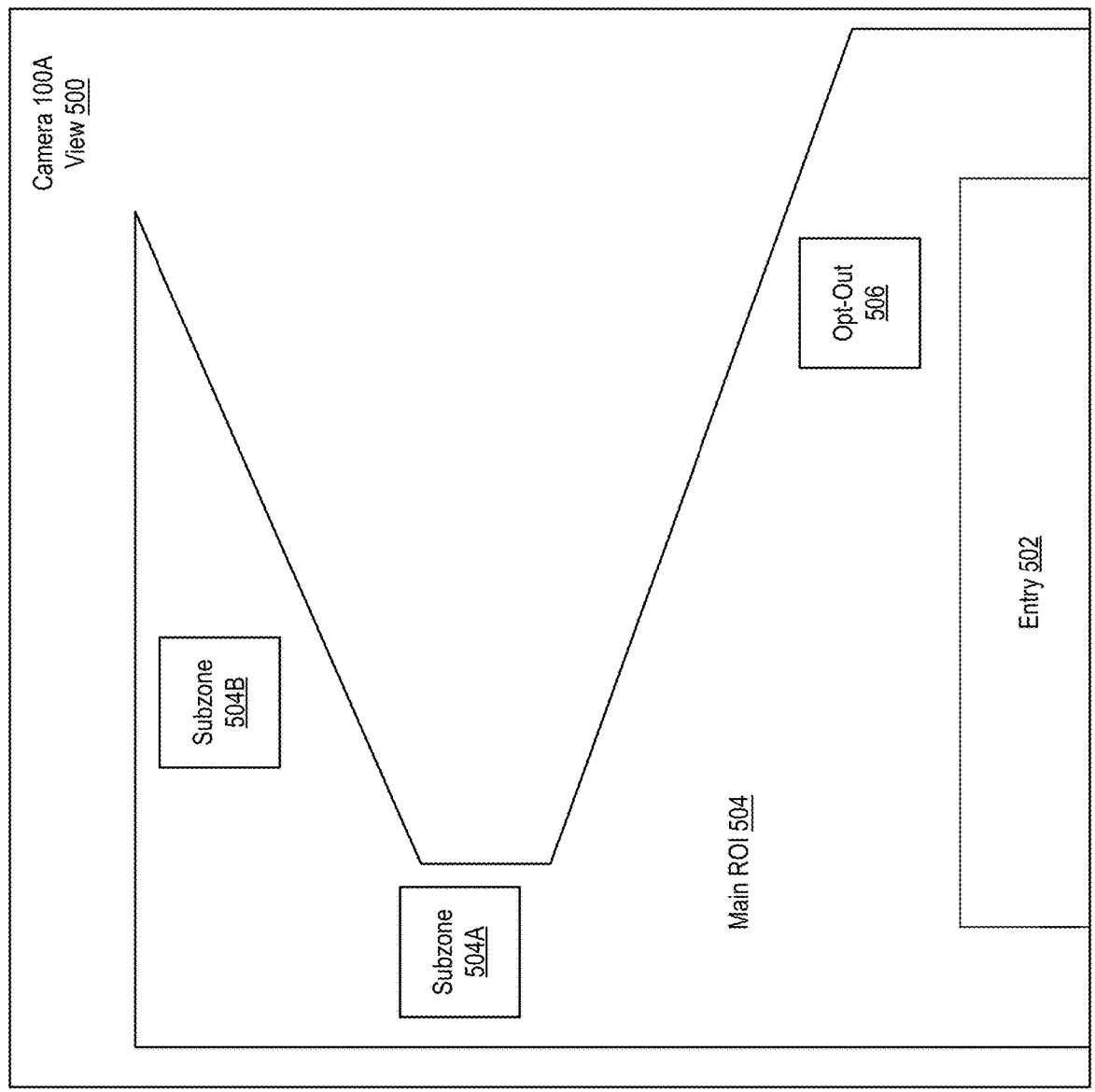
FIG. 5 illustrates an example of different operating zones in accordance with one embodiment.

FIG. 5 illustrates an example scenario where a camera view can encompass a variety of areas or zones and different sized or shaped areas or zones, along with an optional opt-out zone. For example, the view 500 of camera 100A may include a "main" ROI 504. Within ROI 504, there may be one or more subzones 504 (illustrated as first subzone 504A and second subzone 504B). Such subzones can be specified as desired by a user or entity using embodiments of the present disclosure to track object movement or action. For example, in a retail setting, each of subzones 504 may correspond to particular sections of the retail establishment. The entity may wish to gather analytics and/or statistics regarding the number and frequency of visits to subzones 504A and 504B by patrons. An entry point 502 may be defined (as described above). The inclusion of subzones 504 may allow for more fine-grained analytics to be performed.

Proximate to entry point 502 is an opt-out zone 506. Opt-out zone 506 may signify an area(s) where an object, such as a person, patron, visitor, thing, etc. may remain for some determined amount of time to signify a desire to opt out of any detection or monitoring. That is, an ROI may be created delineating the area corresponding to opt-out zone 506. If camera 100A detects the presence of any object within this particular ROI associated with opt-out zone 506, the client edge device corresponding to camera 100A (not shown in FIG. 5) may tag any images reflecting the opt-out object. In this way, any opt-out-tagged images or frames can be deleted prior to being aggregated at the local cluster server, or subsequent to receipt at the global server.

It should be understood that certain analytic operations or functions can be associated with main ROI 504, subzones 504A, 504B, or opt-out zone 506, such as gender identification, age inference, etc.

As alluded to above, embodiments of the present disclosure have broad applicability. Example use cases and applications will be described herein. It should be understood that the following (and above-described) examples are not meant to be limiting in any way, and are provided to enhance understanding of various embodiments of the technologies disclosed herein.

In the context of autonomous vehicle navigation, obstacle (e.g., an object) tracking and avoidance may be integral to successful autonomous vehicle navigation. However, it may be desirable to assign "weights" to certain obstacles or objects in terms of avoidance importance. For example, a piece of paper on the road need not constitute a change in the trajectory of the vehicle, whereas a pylon might. Thus, various embodiments may be used to detect, identify, and re-identify an object (e.g., the piece of paper, etc.) ahead of a traveling vehicle for the purposes of considering the object when planning a navigation path for the vehicle.

With this functionality, it becomes possible to compute a dynamic ROI which represents either the usable space within which the object may travel or a best possible trajectory for the object. For example, a system may implement smart logic in the vein of "if given the decision between avoiding a piece of paper or a pylon and nothing else, avoid the pylon."

Some embodiments disclosed herein have been described in the context of retail analytics. That is, unique objects within the camera network, such as shoppers or employees, can be identified and analytics regarding their whereabouts or behaviors can be determined and/or tracked. In some embodiments, specific ROIs within the network of cameras can be specified (e.g., a new product feature presentation) and specific events or analytics can be assigned to this ROI that may pertain only to this section of the camera network. For example, zones or subzones within the ROI can be defined and monitored. For example, only objects detected, identified, or monitored as being present in the ROI may be re-identified in other ROIs or camera views. Other objects can be ignored if they do not appear in the ROI at least once.

Various embodiments can be used in a theft prevention or surveillance context. For example, information gleaned about patron behavior can be used to predict potential future thefts. Moreover, individual patron (e.g., the object) behavior can be tracked and flagged if questionable. As an illustrative example, it may be determined that an individual is loitering in a particular store aisle or section for a threshold period of time, or if an individual repeatedly moves between two or more zones or camera views. Even if camera view coverage may not be complete (e.g., less than one-hundred percent complete, etc.), object identification or re-identification can assist in detecting potential theft. This may correspond with the same individual being re-identified in a different ROI from a previous ROI. The feature encoding may result in extracting features previously unassociated (e.g., potential stolen goods, etc.) with the individual in the previous ROI.

Smart cities is another application in which various embodiments can prove useful. For example, assume a camera network may span multiple city blocks representing the downtown core of a city. Using embodiments of the present disclosure, foot and vehicle traffic can be identified and monitored throughout public spaces. For vehicles specifically, as an alternative to paid parking, a vehicle's movement through the space can be monitored and can be charged per the time spent in the space rather than a flat parking fee. Similar to in-store retail applications, property owners may offer analytics or other services to building tenants. The services can correspond with the ability to track and/or provide analytics regarding the behavior of crowds in front of the tenant's stores.

Still another applicable use case is in the area of environmental health and safety. For example, employees can be monitored throughout a site to ensure personal protective equipment is being worn correctly and that standard operating procedures (SOPs) or Occupational Safety and Health Administration (OSHA) compliance is maintained. Embodiments can be especially useful in temporary job sites such as construction sites which do not typically have permanent internet or camera networks. Edge devices may allow for portability and adaptability. Embodiments can be used to focus on sensitive materials as objects of interest. This may help ensure that such sensitive materials are being transported throughout a certain facility (e.g., one or more ROIs, etc.) correctly. Embodiments can be used to ensure that heavy machinery is being operated according to health and safety standards.

A digital twin can refer to a digital representation of a physical entity, made possible through an IoT network of sensors and devices. Using a network of cameras such as that described above, can reproduce a physical space through the tracking and location of objects of interest within that space. Objects of interest can be dynamically added to the space on a per-facility basis. ROIs can also be dynamically added with specific instructions associated with them (e.g., a particular set inventory density per ROI, etc.).

In the area of livestock and conservation monitoring, the movement patterns of livestock throughout a monitored space can be tracked. In this case, the object being monitored may correspond with a cluster of individual objects (e.g., the livestock) that make up a group moving together. In some embodiments, distinct animals can be specified for tracking and behavior monitoring.

Further still, the use of drones is becoming ubiquitous. Regions of interest (ROIs) can be set based on drone position or movable path. ROI details can be shared across all drones in a network so that any drone in any position is able to monitor the ROI based on the proximity of the drone to the object, the "best" location, or optimal candidate drone.

Figure 6:
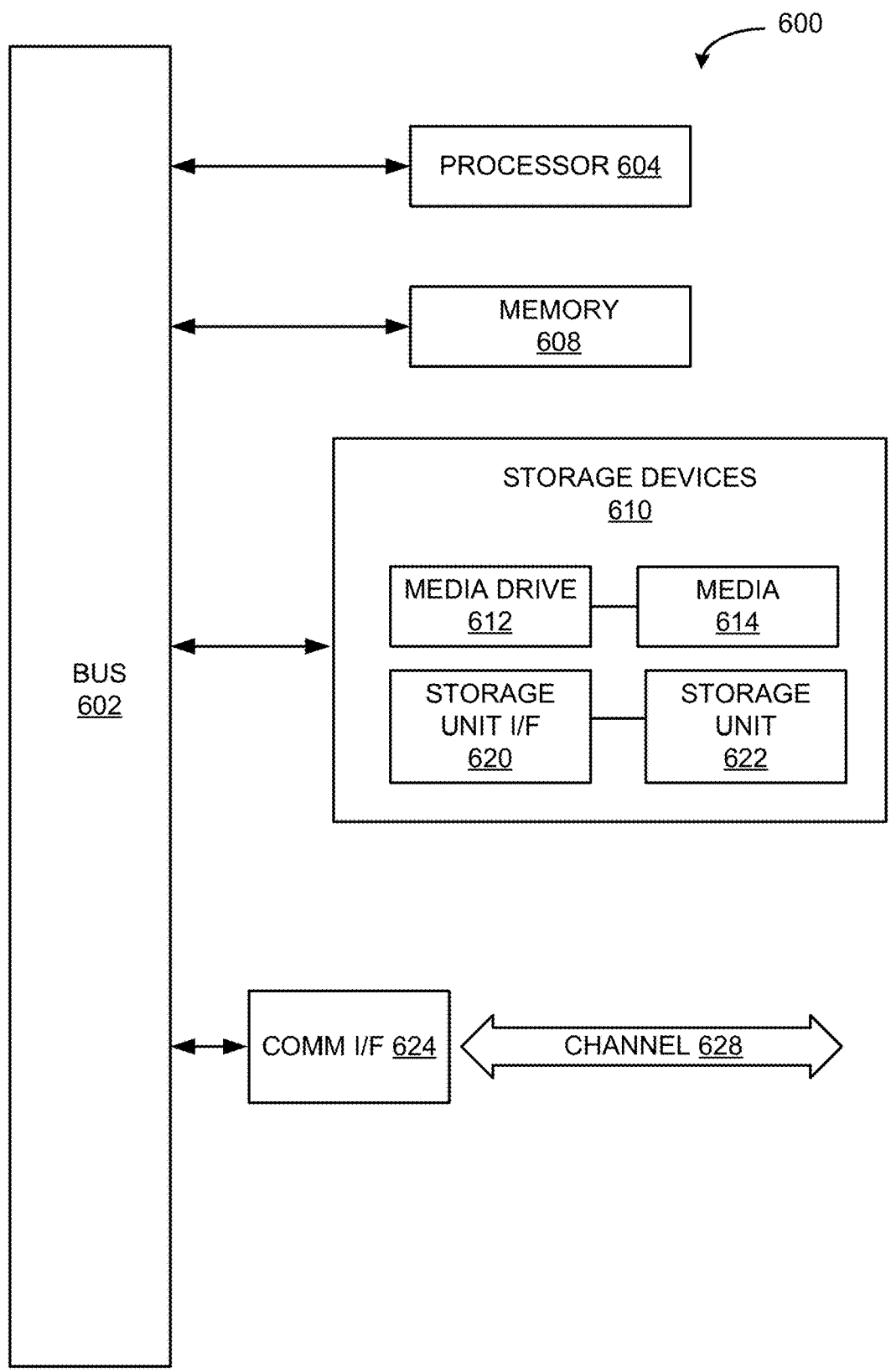
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects, and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
determining, using a first camera, a monitored space with an entry point and an opt-out zone, the first camera configured to detect objects throughout the monitored space through different fields of view;
detecting and tracking, using the first camera, an object as it passes through the entry point and moves within the monitored space;
upon exiting a field of view of the first camera, re-identifying the object in the monitored space pursuant to detection of the object by a second camera;
determining that the object enters the opt-out zone in the field of view of the first camera;

triggering an intentional opt-out command to prevent feature extraction for the object during its movement within the monitored space; and aggregating information regarding the object from the first and second cameras without image frames corresponding to the feature extraction for the object in the opt-out zone.

2. The computer-implemented method of claim 1, further comprising:

performing feature extraction on a first captured image of the object; and generating a first vector code representation of the object by a first client edge device operatively connected to the first camera.

3. The computer-implemented method of claim 2, further comprising:

performing feature extraction on a second captured image of the object; and generating a second vector code representation of the object by a second client edge device operatively connected to the second camera.

4. The computer-implemented method of claim 3, further comprising:

comparing, at a local cluster server operatively connected to the first client edge device and the second client edge device, the first vector code representation and the second vector code representation of the object to determine that the first vector code representation and the second vector code representation represent the object detected and tracked by the first camera and detected by the second camera.

5. The computer-implemented method of claim 1, wherein the object is a first object, and the method further comprising:

generating a bounding box around the first object;

determining a second object within the bounding box, the second object being held or attached to the first object;

tracking the first object and the second object during movement of the first object or the second object within the monitored space of the first camera; and determining gender data or age data using aggregated information regarding the first object from the first and second cameras.

6. The computer-implemented method of claim 1, wherein the monitored space comprises a plurality of discontinuous camera views.

7. The computer-implemented method of claim 1, wherein the object enters the opt-out zone in excess of a threshold amount of time.

8. A computer system comprising:

a memory; and one or more processors that are configured to execute machine readable instructions stored in the memory configured to:

determine, using a first camera, a monitored space with an entry point and an opt-out zone, the first camera configured to detect objects throughout the monitored space through different fields of view;

detect and track, using the first camera, an object as it passes through the entry point and moves within the monitored space;

upon exiting a field of view of the first camera, re-identify the object in the monitored space pursuant to detection of the object by a second camera;

determine that the object enters the opt-out zone in the field of view of the first camera;

trigger an intentional opt-out command to prevent feature extraction for the object during its movement within the monitored space; and aggregate information regarding the object from the first and second cameras without image frames corresponding to the feature extraction for the object in the opt-out zone.

9. The computer system of claim 8, wherein the machine readable instructions stored in memory are further configured to:

perform feature extraction on a first captured image of the object; and generate a first vector code representation of the object by a first client edge device operatively connected to the first camera.

10. The computer system of claim 9, wherein the machine readable instructions stored in memory are further configured to:

perform feature extraction on a second captured image of the object; and generate a second vector code representation of the object by a second client edge device operatively connected to the second camera.

11. The computer system of claim 10, wherein the machine readable instructions stored in memory are further configured to:

compare, at a local cluster server operatively connected to the first client edge device and the second client edge device, the first vector code representation and the second vector code representation of the object to determine that the first vector code representation and the second vector code representation represent the object detected and tracked by the first camera and detected by the second camera.

12. The computer system of claim 8, wherein the object is a first object, and the machine readable instructions stored in memory are further configured to:

generate a bounding box around the first object;

determine a second object within the bounding box, the second object being held or attached to the first object;

track the first object and the second object during movement of the first object or the second object within the monitored space of the first camera; and determine gender data or age data using aggregated information regarding the first object from the first and second cameras.

13. The computer system of claim 8, wherein the monitored space comprises a plurality of discontinuous camera views.

14. The computer system of claim 8, wherein the object enters the opt-out zone in excess of a threshold amount of time.

15. A non-transitory computer-readable storage medium storing a plurality of instructions executable by one or more processors, the plurality of instructions when executed by the one or more processors cause the one or more processors to:

determine, using a first camera, a monitored space with an entry point and an opt-out zone, the first camera configured to detect objects throughout the monitored space through different fields of view;

detect and track, using the first camera, an object as it passes through the entry point and moves within the monitored space;

upon exiting a field of view of the first camera, re-identify the object in the monitored space pursuant to detection of the object by a second camera;

determine that the object enters the opt-out zone in the field of view of the first camera;
trigger an intentional opt-out command to prevent feature extraction for the object during its movement within the monitored space; and
aggregate information regarding the object from the first and second cameras without image frames corresponding to the feature extraction for the object in the opt-out zone.

16. The computer-readable storage medium of claim 15, wherein the monitored space comprises a plurality of discontinuous camera views.

17. The computer-readable storage medium of claim 15, wherein the object enters the opt-out zone in excess of a threshold amount of time.

18. The computer-implemented method of claim 1, further comprising:
tagging images reflecting the object as an opt-out object prior to preventing the feature extraction for the object during its movement within the monitored space.

19. The computer-implemented method of claim 5, further comprising:
saving the first object and the second object as separate entries in an object gallery.

20. The computer-implemented method of claim 5, further comprising:
implementing a theft prevention analysis on the object during its movement within the monitored space during a threshold period of time.

* * * * *